United States Patent
Chun

(10) Patent No.: US 8,743,844 B2
(45) Date of Patent: Jun. 3, 2014

(54) APPARATUS AND METHOD FOR SETTING TIME INFORMATION IN MOBILE COMMUNICATION SYSTEM

(75) Inventor: Young-Gun Chun, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1266 days.

(21) Appl. No.: 11/953,519

(22) Filed: Dec. 10, 2007

(65) Prior Publication Data

US 2008/0137619 A1 Jun. 12, 2008

(30) Foreign Application Priority Data

Dec. 8, 2006 (KR) ........................ 10-2006-0124519

(51) Int. Cl.
*H04J 3/00* (2006.01)
(52) U.S. Cl.
USPC .......................................................... 370/336
(58) Field of Classification Search
USPC .......................................................... 370/336
See application file for complete search history.

(56) References Cited

U.S. PATENT DOCUMENTS

| | | | |
|---|---|---|---|
| 2002/0069037 A1* | 6/2002 | Hendrickson et al. | 702/186 |
| 2003/0083077 A1* | 5/2003 | Chung | 455/456 |
| 2006/0059152 A1* | 3/2006 | Nakamura | 707/7 |
| 2006/0094416 A1* | 5/2006 | Endo et al. | 455/423 |
| 2007/0070930 A1* | 3/2007 | Abu-Amara | 370/315 |
| 2008/0155080 A1* | 6/2008 | Marlow et al. | 709/223 |

FOREIGN PATENT DOCUMENTS

| | | |
|---|---|---|
| JP | 2002-359872 | 12/2002 |
| KR | 1020000013464 | 3/2000 |
| KR | 1020000044264 | 7/2000 |
| KR | 1020030034663 | 5/2003 |
| KR | 1020060042501 | 5/2006 |

* cited by examiner

*Primary Examiner* — Shripal Khajuria
(74) *Attorney, Agent, or Firm* — The Farrell Law Firm, P.C.

(57) ABSTRACT

Provided are an apparatus and a method for setting time information of an area in which a portable terminal, used in an asynchronous mobile communication system, is positioned. The apparatus includes a communicator for transmitting a time information setup request message to a Base Station (BS) and receiving a time information setup complete information from the BS, and a controller for generating the time information setup request message by changing a message type of a Mobility Management (MM) information message and setting the time information of the portable terminal using the time information setup complete message.

22 Claims, 3 Drawing Sheets

APPARATUS AND METHOD FOR SETTING TIME INFORMATION IN MOBILE COMMUNICATION SYSTEM

PRIORITY

This application claims priority under 35 U.S.C. §119(a) to an application filed in the Korean Intellectual Property Office on Dec. 8, 2006 and assigned Serial No. 2006-124519, the contents of which are herein incorporated by reference.

BACKGROUND OF THE INVENTION

1. Field of the Invention

The present invention relates generally to a portable terminal using an asynchronous mobile communication system, and in particular, to an apparatus and a method for checking time and date information of an area in which a portable terminal using an asynchronous mobile communication system is currently positioned.

2. Description of the Related Art

Mobile communication technology was abruptly developed with the common use of cellular phones in the early 1980s. A Universal Mobile Telecommunication System (UMTS) has been developed and serviced based on the mobile communication technology in order to allow portable terminal users or computer users to transmit voice, video, and multimedia data at a high speed of 2 Mbps or more.

The UMTS has been commonly serviced in many countries throughout the world, has increased a number of subscribers thereto, and has been standardized in the $3^{rd}$ Generation Partnership Project (3GPP). The UMTS can effectively provide higher speed data and/or multimedia services than an existing $2^{nd}$ Generation communication system. The UMTS is also expected to be used throughout the world and thus can provide an international roaming function in any place.

A portable terminal, which supports such a UMTS, supports a Global System for Mobile Communication (GSM) system and the UMTS to change a network mode and maintain communications according to signals received from the GSM system and the UMTS.

The term "network mode" refers to a network environment that can be set and used in a portable terminal. For example, the network mode means an environment that is set to use a UMTS network mode together with a GSM network mode or use only the UMTS network mode or the GSM network mode during a call connection in a portable terminal.

In contrast to a portable terminal using an asynchronous mobile communication system that receives a satellite signal to provide current time and date information, the above-mentioned portable terminal does not receive a satellite signal. Thus, a user must directly set a current time or receive Mobility Management (MM) information from a Base Station (BS) to set current time in the above-mentioned portable terminal.

In the asynchronous mobile communication system, the user must directly set a time whenever the user moves from one area to another area, and the BS determines the local time, e.g., when Daylight Saving Time starts or ends, to provide time information. Thus, the time information, e.g., the current time, the current date, etc., cannot be set.

Accordingly, there is required an apparatus and a method for providing time and date information according to a request of a user in a portable terminal used in the asynchronous mobile communication system.

SUMMARY OF THE INVENTION

An aspect of the present invention is to substantially solve at least the above problems and/or disadvantages and to provide at least the advantages below. Accordingly, an aspect of the present invention is to provide an apparatus and a method for obtaining a current time in an asynchronous mobile communication system.

Another aspect of the present invention is to provide an apparatus and a method for requesting time information from a Base Station (BS) in an asynchronous portable terminal.

A further aspect of the present invention is to provide an apparatus and a method for checking time information and providing the time information to an asynchronous portable terminal in a BS that has received a request for the time information from the asynchronous portable terminal.

According to one aspect of the present invention, there is provided an apparatus for checking time information in a portable terminal used in an asynchronous mobile communication system, including a communicator for transmitting a time information setup request message to a BS and receiving a time information setup complete information from the BS, and a controller for generating the time information setup request message by changing a message type of a Mobility Management (MM) information message and setting the time information of the portable terminal using the time information setup complete message.

According to another aspect of the present invention, there is provided a method of requesting time information in an asynchronous portable terminal, including changing a message type of an MM information message to generate a time information setup request message, transmitting the time information setup request message to a BS, and receiving a time information setup complete message corresponding to the time information setup request message from the BS to set a time information of the asynchronous portable terminal.

According still another aspect of the present invention, there is provided an asynchronous mobile communication system providing time information, including a portable terminal for transmitting a time information setup request message to a BS, and the BS for transmitting a time information setup complete message comprising a time information of the portable terminal in response to the time information setup request message to the portable terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and a method for requesting time information of a Base Station (BS) and receiving the time information from the BS using Mobility Management (MM) information, which is defined in 3$^{rd}$ Generation Partnership Project (3GPP) Technical Specification (TS) 24.008, in order to obtain current time in a portable terminal using an asynchronous mobile communication system. Also, the time information includes all information as to date, time, day, etc. of an area in which the portable terminal is positioned.

Figure 1:
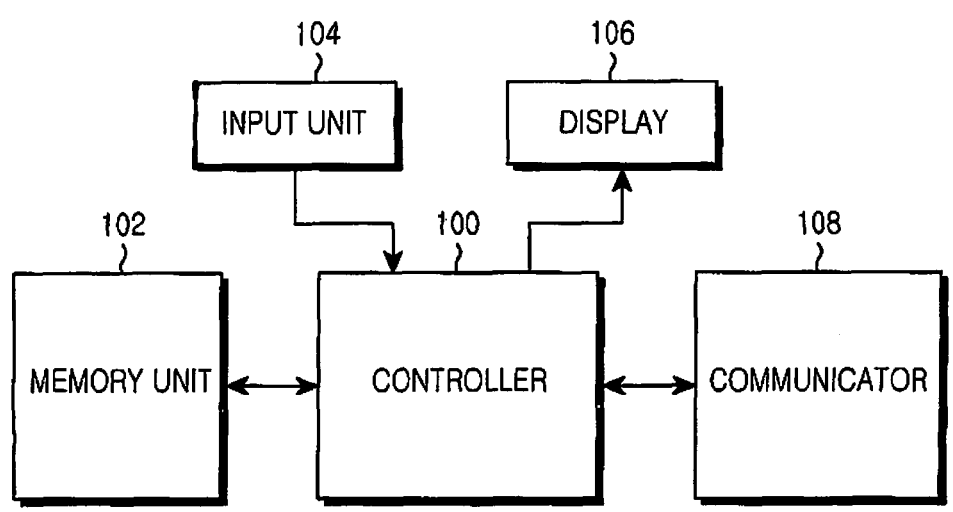
FIG. 1 is a block diagram of an asynchronous portable terminal capable of setting time information according to an embodiment of the present invention.

FIG. 1 is a block diagram of an asynchronous portable terminal capable of setting time information according to an embodiment of the present invention.

Referring to FIG. 1, the asynchronous portable terminal includes a controller 100, a memory unit 102, an input unit 104, a display 106, and a communicator 108.

The controller 100 controls an overall operation of the asynchronous portable terminal. For example, the controller 100 performs processing and controlling for voice and data communications. According to the present invention, besides the normal functions of processing and controlling, if a time information setup event occurs, the controller 100 generates an MM information message, which is defined in 3GPP TS 24.008, as a time information setup request message and transmits the time information setup request message to a BS.

If the controller 100 receives a message including time information from the BS, the controller 100 sets time information of the asynchronous portable terminal using the time information of the message. The time information setup request message and the message including the time information will be described in more detail later with reference to FIGS. 2 and 3.

Therefore, the descriptions of normal processing and controlling operations of the controller 100 will be omitted herein.

The memory unit 102 includes a Read Only Memory (ROM) and a Random Access Memory (RAM). Here, the ROM stores micro-codes of a program for the processing and controlling operations of the controller 100 and various types of reference data.

The RAM is a working memory of the controller 100 and stores temporary data generated during executions of various kinds of programs.

The memory unit 102 may be attached to and/or detached from the asynchronous portable terminal and include a microprocessor and a memory chip to include a Subscriber Identification Module (SIM) card which stores various types of information of a user.

The input unit 104 includes a plurality of function keys which includes numerical key buttons from "0" to "9," a menu button, a cancel (delete) button, a confirm button, a talk button, an end button, an Internet access button, a navigation key, character input keys, etc. The input unit 104 also provides the controller 100 with key input data (e.g., a time information setup request) corresponding to a key pressed by the user.

The display 106 displays state information, limited numerical characters, a large number of moving pictures, a large number of still pictures, etc. generated during the operation of the asynchronous portable terminal. The display 106 may be a color Liquid Crystal Display (LCD).

The communicator 108 includes Universal Mobile Telecommunication System (UMTS) and Global System for Mobile Communication (GSM) modules. The UMTS module is controlled by the controller 100 to operate if a 3$^{rd}$ generation system communication mode is selected. Thus, during a receipt operation, the UMTS module downconverts a Radio Frequency (RF) signal received through an antenna and performs channel decoding on the RF signal. During a transmission operation, the UMTS module performs channel coding on data and upconverts the RF signal to transmit the data through the antenna.

The GSM module is controlled by the controller 100 to operate if a 2$^{nd}$ generation communication mode is selected. Thus, during a receipt operation, the GSM module downconverts the RF signal received through the antenna and performs channel decoding on the RF signal. During a transmission operation, the GSM module performs channel coding on the data and upconverts the RF signal to transmit the data through the antenna.

The apparatus for checking the time information in the asynchronous mobile communication system has been described. A method of setting time information using the apparatus according to an embodiment of the present invention will now be described.

Figure 2:
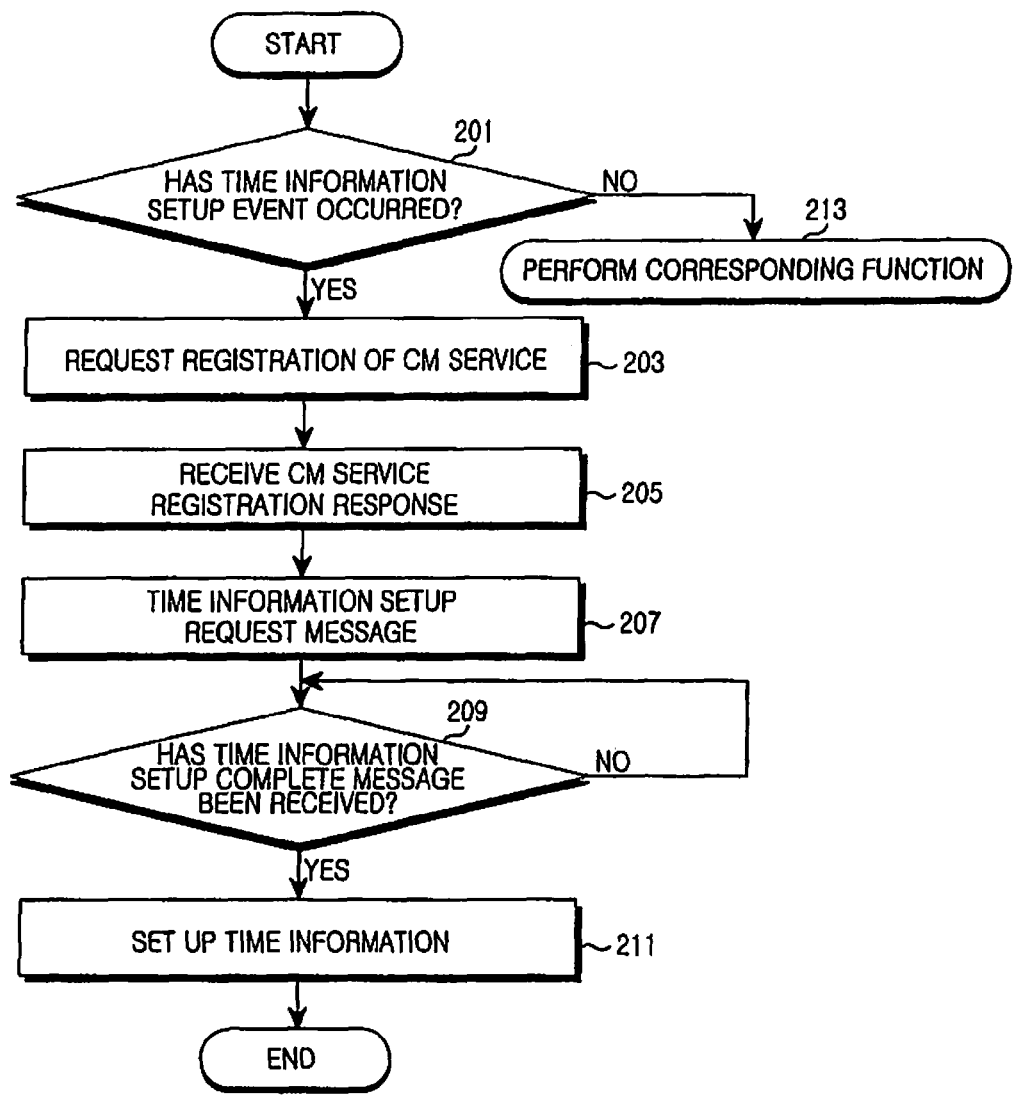
FIG. 2 is a flowchart of a process of setting time information in a portable terminal according to an embodiment of the present invention.

FIG. 2 is a flowchart of a process of setting time information in a portable terminal according to an embodiment of the present invention.

Referring to FIG. 2, in step 201, the controller 100 of the portable terminal determines whether a time information setup event has occurred. The time information setup event refers to an event for setting time and date of the portable terminal.

If it is determined in step 201 that the time information setup event has not occurred, the controller 100 goes to step 213 to perform a corresponding function, e.g., a standby mode.

If it is determined in step 201 that the time information setup event has occurred, the controller 100 proceeds to step 203 to request a Configuration Management (CM) service for registering a network access function. Here, a CM service request message is transmitted to an exchanger through a BS in order to perform the request for the CM service.

In step 205, the controller 100 receives a CM service registration response message from the BS. In step 207, the controller 100 generates a time information setup request message by changing a message type of a Mobility Management (MM) information message and transmits a time information setup request message, which is defined in 3GPP TS 24.008, to request time information.

In other words, the changed message type of the MM information message means a time information setup request message.

Here, a format of the time information setup request message is shown in Table 1 below.

TABLE 1

| IEI | Information Element | Type/Reference | Presence | Format | Length |
|---|---|---|---|---|---|
| | Mobility Management Protocol Discriminator | Protocol Discriminator | M | V | ½ |
| | Skip Indicator | Skip Indicator | M | V | ½ |
| | MM Information | Message Type | M | V | 1 |
| | Full Name for Network | Network Name | M | TLV | 3-? |
| | RAT | RAT | M | TLV | 3-? |
| | LAI | LAI | M | TLV | 3-? |

The controller 100 may change a message type of the MM information message defined as in Table 2 below to request the time information.

TABLE 2

| xxxx---- | Time Setup Information Message |
|----------|--------------------------------|
| xxxx     | Time Information Setup Request |

In addition, the time information setup request message includes Location Area Identity (LAI) information as shown in Table 1 above.

The LAI information includes a Mobile Country Code (MCC), a Mobile Network Code (MNC), and a Location Area Code (LAC). The MCC indicates a country in which the portable terminal is positioned. The MNC indicates a mobile network that provides a communication service within a country in which the portable terminal is positioned. The LAC indicates an area in which the portable terminal is positioned within the mobile network.

If the portable terminal is a portable terminal that supports $2^{nd}$ GSM and $3^{rd}$ UMTS modes, the controller 100 may transmit the MM information message together with Radio Access Technology (RAT) information of a network in which the portable terminal is registered.

In step 209, the controller 100 determines whether a time information setup complete message has been received from the BS.

The message type of the MM information message received from the BS may be checked to determine whether the time information setup complete information has been received. The message type of the MM information message will be described in more detail with reference to FIG. 3.

In step 211, the controller 100 sets time information of the portable terminal and then ends the present process.

Figure 3:
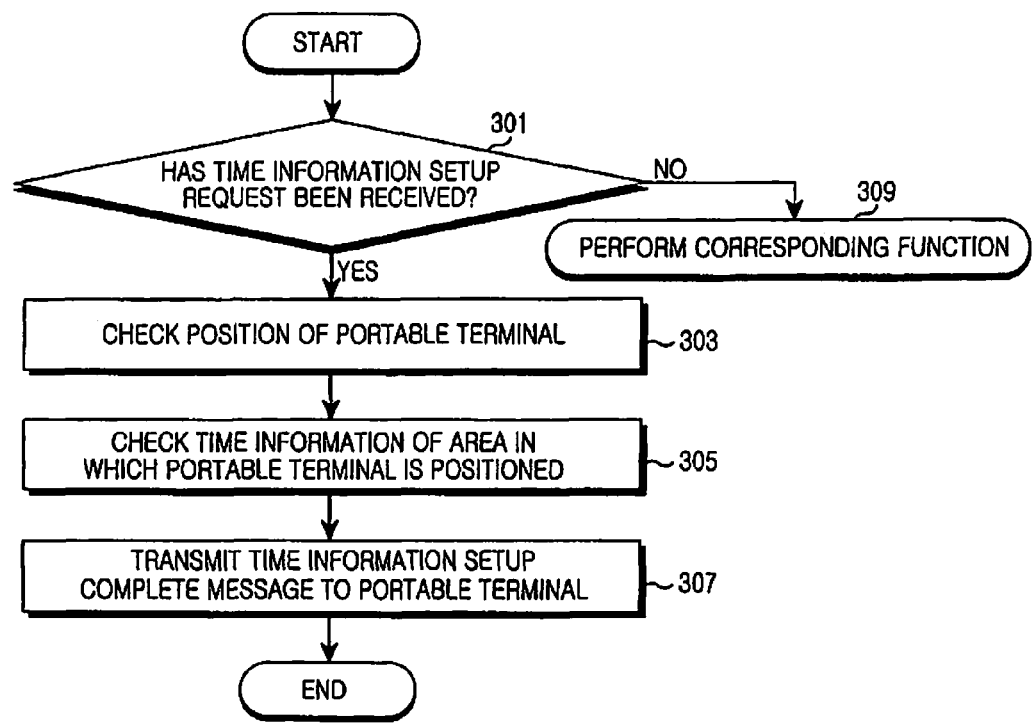
FIG. 3 is a flowchart of a process of providing time information to a portable terminal in a Base Station (BS) according to an embodiment of the present invention.

FIG. 3 is a flowchart of a process of providing time information to a portable terminal in a BS according to an embodiment of the present invention.

Referring to FIG. 3, in step 301, the BS determines whether a time information setup request message has been received from the portable terminal.

Here, the time information setup request message is an MM information message received from the portable terminal. Thus, the BS can check the time information setup request message using a message type of the MM information message. The message type is as shown in Table 1 above as described with reference to FIG. 2.

If it is determined in step 301 that the time information setup request message has not been received from the portable terminal, the BS goes to step 309 to perform a corresponding function, e.g., a standby mode.

If it is determined in step 301 that the time information setup request message has been received from the portable terminal, the BS proceeds to step 303 to check LAI information of the time information setup request message so as to check a position of the portable terminal. In step 305, the BS checks time information of an area in which the portable terminal is positioned.

In step 307, the BS transmits time information setup complete message to the portable terminal that has transmitted the time information setup request message.

Here, the time information setup complete information may be transmitted using an MM information message as shown in Table 3 below. The BS may change a message type of the MM information message to transmit the time information setup complete information to the portable terminal using the MM information message.

TABLE 3

| IEI | Information Element | Type/Reference | Presence | Format | Length |
|-----|---------------------|----------------|----------|--------|--------|
|     | Mobility Management Protocol Discriminator | Protocol Discriminator | M | V | ½ |
|     | Skip Indicator | Skip Indicator | M | V | ½ |
|     | MM Information | Message Type | M | V | 1 |
|     | Full Name for Network | Network Name | M | TLV | 3-? |
| xx  | Short Name for Network | Network Name | M | TLV | 3-? |
| xx  | Local Time Zone | Time Zone | O | TLV | 2 |
| xx  | Universal Time and Local Time Zone | Time Zone and Time | O | TLV | 8 |
| xx  | LSA Identity | Identifier | O | TLV | 2-5 |
| xx  | Network Daylight Saving Time | Daylight Saving Time | O | TLV | 3 |

Here, the message type of the MM information message including the time information setup complete information may be defined as in Table 4 below. The BS may transmit the time information setup complete information to the portable terminal using the defined message type.

TABLE 4

| xxxx---- | Time Setup information Message |
|----------|--------------------------------|
| xxxx     | Time Information Setup Complete |

The BS ends the present process.

In accordance with the present invention as described above, time information can be requested of a BS using a portable terminal and then checked. Thus, in contrast to an existing asynchronous portable terminal in which a user directly inputs time and date, the portable terminal of the present invention can easily set up the time information without performing a process of inputting time and date.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for setting time information in a portable terminal using an asynchronous mobile communication system, comprising:
    a communicator for transmitting a time information setup request message to a Base Station (BS) and receiving a time information setup complete message from the BS; and
    a controller for generating the time information setup request message and setting the time information of the portable terminal using the time information setup complete message, wherein the time information setup complete message comprises at least one of a current time and a current date of an area in which the portable terminal is positioned.

2. The apparatus of claim 1, wherein the time information setup request message and the time information setup complete message are defined in the following table:

| |
|---|
| x x x x - - - - Time Setup information Message |
| x x x x Time Information Setup Request |
| x x x x Time Information Setup Complete |

3. The apparatus of claim 1, wherein the time information setup request message comprises Location Area Identity (LAI) information.

4. The apparatus of claim 3, wherein the LAI information comprises at least one of a Mobile Country Code (MCC), a Mobile Network Code (MNC), and a Location Area Code (LAC), wherein the MCC indicates a country in which the portable terminal is positioned, the MNC indicates a mobile network providing a communication service within the country in which the portable terminal is positioned, and the LAC indicates an area in which the portable terminal is positioned within the mobile network.

5. The apparatus of claim 1, wherein the communicator includes a communication module corresponding to a communication mode for, downconverting a received Radio Frequency (RF) signal and performing channel decoding on the RF signal during a receipt operation, and performing channel coding and upconverting the RF signal during a transmission operation.

6. The apparatus of claim 5, wherein if a $2^{nd}$ generation communication mode is selected, the communication module is a GSM module.

7. The apparatus of claim 1, wherein the time information setup complete message comprises time information corresponding to a determined location based on LAI information of the time information setup request message.

8. A method of requesting time information in an asynchronous portable terminal, comprising:
  generating a time information setup request message;
  transmitting the time information setup request message to a Base Station (BS); and
  receiving a time information setup complete message corresponding to the time information setup request message from the BS to set a time information of the asynchronous portable terminal,
  wherein the time information setup complete message comprises at least one of a current time and a current date of an area in which the portable terminal is positioned.

9. The method of claim 8, wherein the time information setup request message is defined in the following table:

| |
|---|
| x x x x - - - - Time Setup information Message |
| x x x x Time Information Setup Request |

10. The method of claim 9, wherein the time information setup request message comprises a Location Area Identity (LAI) information.

11. The method of claim 10, wherein the LAI information comprises at least one of an MCC, an MNC, and an LAC, wherein the MCC indicates a country in which the portable terminal is positioned, the MNC indicates a mobile network providing a communication service within the country in which the portable terminal is positioned, and the LAC indicates an area in which the portable terminal is positioned within the mobile network.

12. The method of claim 8, wherein a communication module, corresponding to a communication mode, downconverts a received Radio Frequency (RF) signal and performs channel decoding on the RF signal during a receipt operation, and performs channel coding and upconverts the RF signal during a transmission operation.

13. The method of claim 12, wherein if a $2^{nd}$ generation communication mode is selected, the communication module is a GSM module.

14. The method of claim 8, wherein the time information setup request message and the time information setup complete message are defined in the following table:

| |
|---|
| x x x x - - - - Time Setup information Message |
| x x x x Time Information Setup Request |
| x x x x Time Information Setup Complete |

15. The method of claim 8, wherein the time information setup complete message comprises time information corresponding to a determined location based on LAI information of the time information setup request message.

16. An asynchronous mobile communication system providing time information, comprising:
  a portable terminal for transmitting a time information setup request message to a BS; and
  the BS for transmitting a time information setup complete message comprising a time information of the portable terminal in response to the time information setup request message to the portable terminal,
  wherein the time information setup complete message comprises at least one of a current time and a current date of an area in which the portable terminal is positioned.

17. The asynchronous mobile communication system of claim 16, wherein the time information setup request message comprises a Location Area Identity (LAI) information.

18. The asynchronous mobile communication system of claim 17, wherein the LAI information comprises at least one of an MCC, an MNC, and an LAC, wherein the MCC indicates a country in which the portable terminal is positioned, the MNC indicates a mobile network providing a communication service within the country in which the portable terminal is positioned, and the LAC indicates an area in which the portable terminal is positioned within the mobile network.

19. The asynchronous mobile communication system of claim 16, further comprising a communicator including a communication module corresponding to a communication mode for, downconverting a received Radio Frequency (RF) signal and performing channel decoding on the RF signal during a receipt operation, and performing channel coding and upconverting the RF signal during a transmission operation.

20. The asynchronous mobile communication system of claim 19, wherein if a $2^{nd}$ generation communication mode is selected, the communication module is a GSM module.

21. The asynchronous mobile communication system of claim 16, wherein the time information setup request message and the time information setup complete message are defined in the following table:

```
x x x x - - - - Time Setup information Message
      x x x x Time Information Setup Request
      x x x x Time Information Setup Complete
```

22. The asynchronous mobile communication system of claim 16, wherein the time information setup complete message comprises time information corresponding to a determined location based on LAI information of the time information setup request message.

\* \* \* \* \*